Aug. 13, 1963  R. O. WORK  3,100,655
BAYONET TYPE COUPLING WITH PIVOTED SEGMENT RELEASE MEANS
Filed March 17, 1961  2 Sheets-Sheet 1

INVENTOR:
Ralph O. Work
BY

Attorney

Aug. 13, 1963     R. O. WORK     3,100,655
BAYONET TYPE COUPLING WITH PIVOTED SEGMENT RELEASE MEANS
Filed March 17, 1961     2 Sheets-Sheet 2
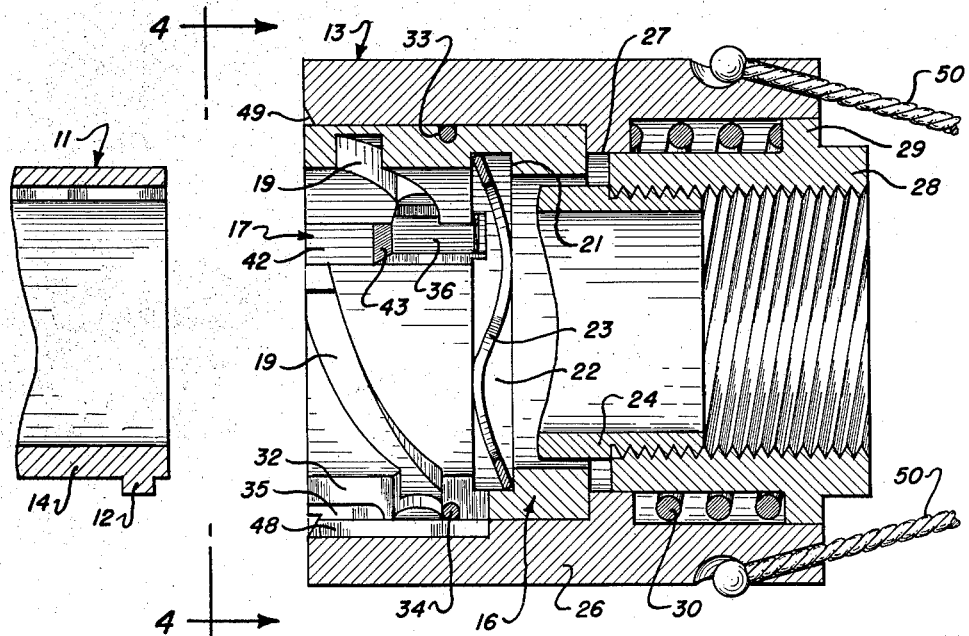
Fig. 3
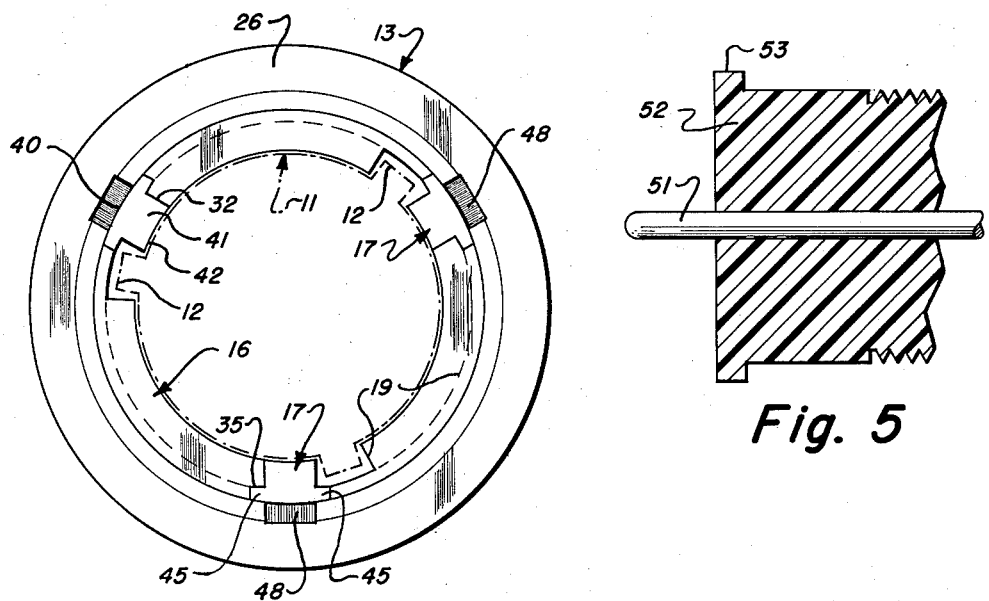
Fig. 4
Fig. 5
INVENTOR:
Ralph O. Work
BY
*Roland A. Anderson*
Attorney United States Patent Office 3,100,655
Patented Aug. 13, 1963

3,100,655
BAYONET TYPE COUPLING WITH PIVOTED
SEGMENT RELEASE MEANS
Ralph O. Work, Albuquerque, N. Mex., assignor, by mesne assignments, to the United States of America as represented by the United States Atomic Energy Commission
Filed Mar. 17, 1961, Ser. No. 96,626
4 Claims. (Cl. 285—33)

The present invention relates generally to connecting means and more particularly to a positive-mating connecting device capable of being readily and rapidly disengaged.

In many instances it is desirable to employ a connecting means in an operation where it is highly advantageous to provide for rapidly and positively releasing or disconnecting the mating elements of the connecting means; such operations may be, for example, air lines between a tractor and a trailer or circuits between an electrical system and a power supply. The present invention aims to attain such results by providing a connector in which the mating parts are normally engaged with each other through a bayonet type joint and in using a mechanical release for selectively rendering the joint incapable of maintaining the engagement.

An object of the present invention is to provide new and improved connecting means for quickly and positively terminating an operating connection.

Another object is to provide a connector in which a mechanical release functions to render ineffective the holding capabilities of the connector joining means in response to axial movement of a controlling member.

A further object is to provide improved selectively detachable connector means of relatively simple and inexpensive construction.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

In the accompanying drawings:

FIG. 3 is a longitudinal sectional view showing the mating parts separated from one another;

FIG. 4 is an end view of one of the parts taken along line 4—4 of FIG. 3; and

FIG. 5 is a longitudinal sectional view of an electrical conducting unit capable of use in the present invention.

Figure 1:
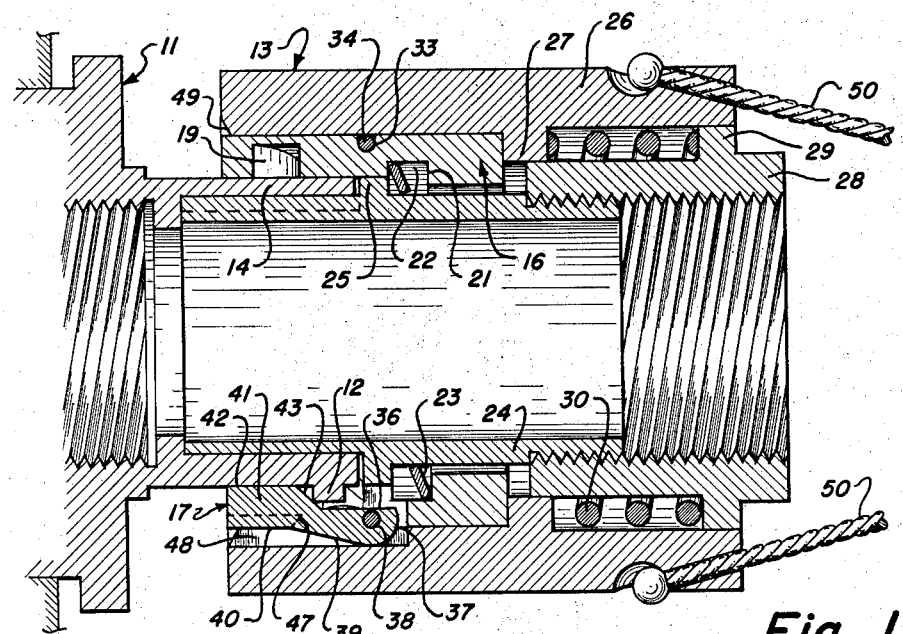
FIG. 1 is a longitudinal sectional view showing the mating parts of the present invention in an engaged position.

As shown in FIGS. 1-4, the device of the present invention generally comprises a first connecting portion 11 including a plurality of radially or outwardly extending bayonet pins 12 adjacent the leading edge of the first portion and a second connecting portion 13 with a number of helical groove means in a ring member 16 adapted to receive the pins 12. The ring 16 also includes latch means 17 which are near the far or closed ends of each groove means and are controlled by actuation of an outer movable sleeve means to release the pins 12 and the first connecting portion 11 from engagement with the second connecting portion, thereby providing a rapid-release mechanism for readily disengaging the first and second connecting portions.

Described more particularly, the present invention comprises a first connecting portion 11 which is normally ring shaped and attached to a conduit, panel, bulkhead or otherwise by suitable attaching means. The inner surface of the first connecting portion may be threaded or provided with equivalent joining means for receiving a fluid conveying conduit or the like. Three bayonet or retaining pins 12, as shown (FIG. 4), may be placed 120° apart from one another on the outer surface of the first portion which forms the male section 14 of the connector assembly.

The ring member 16 or "socket" section in the second portion of the connector assembly contains a number of helical slots or grooves 19 coresponding to number of pins 12 and extending approximately half the axial length of the ring member 16. An inwardly extending shoulder 21 is provided adjacent the non-grooved end of the ring member 16 and froms one side wall of the circumferential recess 22, to contain a spring washer 23 or its equivalent that may be placed within the reces 22 to perform a mating function to be described below.

An externally threaded barrel 24 with the external diameter of the threaded portion slightly less than the internal diameter of the ring shoulder 21 is provided with a radially outwardly extending shoulder 25 adjacent one end thereof which abuts the spring 23 when the barrel is inserted into the ring 16. A sleeve 26 having an inwardly disposed shoulder 27 is placed over the ring 16 with the shoulder 27 abutting the non-grooved end of the ring 16. An internally threaded retaining member 28, with an external diameter slightly less than the internal diameter of the shoulder 27 and having an outwardly disposed shoulder 29 against which one end of a helical compression spring 30 rests, is threaded upon the barrel 24, pulling the retaining member 28 inwardly toward the ring 16 with the other end of the spring 30 abutting shoulder 27. The retaining member 28 may be drawn up against the ring member 16 or a slight space between the ring 16 and retaining member 28 may be maintained for allowing some extent of flexibility to the connection.

The ring member 16 also contains a plurality of, shown as three, axially extending slots 32 which communicate with the grooves 19 near their innermost ends and an annular groove 33 which is formed about the periphery of the ring member 16 for accommodating a wire locking ring 34 that holds latch members 17 as will be further brought out. The area surrounding the outer portion of each slot 32 may be slightly chamfered to provide a depressed seating surface 35 for the latch means or members 17.

The latch means 17 each comprise a flat inner surface 36 shown generally parallel to the longitudinal axis of the connector assembly and extends approximately one half the length of the latch member. A portion of the outer surface 37 above the inner surface 36 and near one end of the latch is shown of arcuate shape and concentric with the wire locking ring 34 which passes through a bore 38 in the latch. This arcuate shape 37 may merge with or be tangential with an inclined surface 39, which in turn joins with the flat outer surface 40 of the other end or forward half of the latch at a point in a cylindrical surface which coincides with the inner surface of sleeve 26 and the outer surface of ring 16 (see 40, FIG. 4). The forward half of each latch member is shown provided with an inwardly extending lip 41 and is positioned within the slot 32 so that the surface 42 of the lip 41 is at a common level or location with the inner surface of the ring 16. A steeply inclined or vertical camming surface 43, shown approximately at the center of the latch, joins the lip surface 42 to surface 36. The outer surface 40 extends into a pair of ear-like projections 45 which fit within the chamfer and rest upon the seating surface 35 (FIG. 4) for preventing the latches from passing through the ring 16 or swinging inwardly into the open central portion thereof. The inner ends 47 of the ear-like projections are cut on inclined planes for performing a function to be explained below.

The sleeve 26 contains three grooves 48, as shown, which fit over the latch members 17 and their arcuate shape 37 and inclined surface 39 to permit the sleeve 26 to move axially over the ring member 16 but not rotationally. The sleeve may be provided with a beveled end portion 49 about the inner surface for aiding the movement of the latch means 17. A lanyard 50 may be attached to the sleeve 26 in any suitable manner to facilitate controlling the axial movement of the sleeve 26 and selective separation of appropriate parts.

While in the above description of the device three pins, grooves and latches are described, it will be obvious to others, when practicing the invention, to use any desired number of pins, grooves and latches, as well as springs 23 or 30 of any suitable strengths.

To use the connector assembly in a fluid conveying system all that would be necessary is to attach a pair of fluid conveying conduits to the connector by providing each such conduit with a threaded surface, joining one to the threaded interior of the first portion and the other to threaded interior of the second portion.

However, the connector assembly is not limited to merely fluid conveying apparatus in that electrical conductors may be joined to one another through the connector. In FIG. 5 an example of one type electrical conductor is shown which may be used with the connector. The conductor 51 shown is similar to the inner conductor of a coaxial cable and may be provided with either a pin or receptacle type connecting element. The inner conductor 51 may be surrounded by a suitable insulating material 52 which may be provided with shoulder means 53 corresponding to shoulder 25 on the barrel 24 when used in the second portion. The insulating material 52 may be threaded so as to be screwed into either the first portion or the retaining member of the second portion. Thus, when the mating parts of the connector are joined, the pin of the connecting element in one portion will engage the pin receptacle of the connecting element in the other portion to form an electrical path.

*Operation*

To assemble the connector "halves" the pins 12 of one half are first aligned with the openings to the helical grooves 19 in the second portion or half, and inserted therein. As the pins 12 enter the helical grooves 19 a projection on the barrel 24 enters a keyway 15 in the section 14 to "key" the barrel 24 to the section 14 and thereby preventing relative rotation therebetween (FIG. 1). This keying arrangement permits the ring 16 and the sleeve 26 to rotate in either direction with respect to the "fixed" barrel 24 so as to perform the coupling operation hereinafter described. The sleeve 26 is then rotated, counter-clockwise as shown, causing the ring to rotate therewith and thus move the grooves 19 over the pins 12. As the pins 12 near the end of their extent of travel in the grooves 19, the end of the male section 14 of the first portion 11 abuts the shoulder 25 on the barrel 24 causing the pins 12 to bear against the forward walls of the grooves 19 which in turn effects the forward movement of ring 16 to compress the spring washer 23 between the shoulders 21 and 25. Thus when the pins 12 reach their limit of travel the spring washer forces the pins 12 into slots 32. Such movement of the pins by the spring washer positions the pins against the camming surfaces 43, which are preferably positioned a slight distance forward of the point where the grooves 19 intersect the slots 32 so as to form a suitable seating surface for the pins 12.

Figure 2:
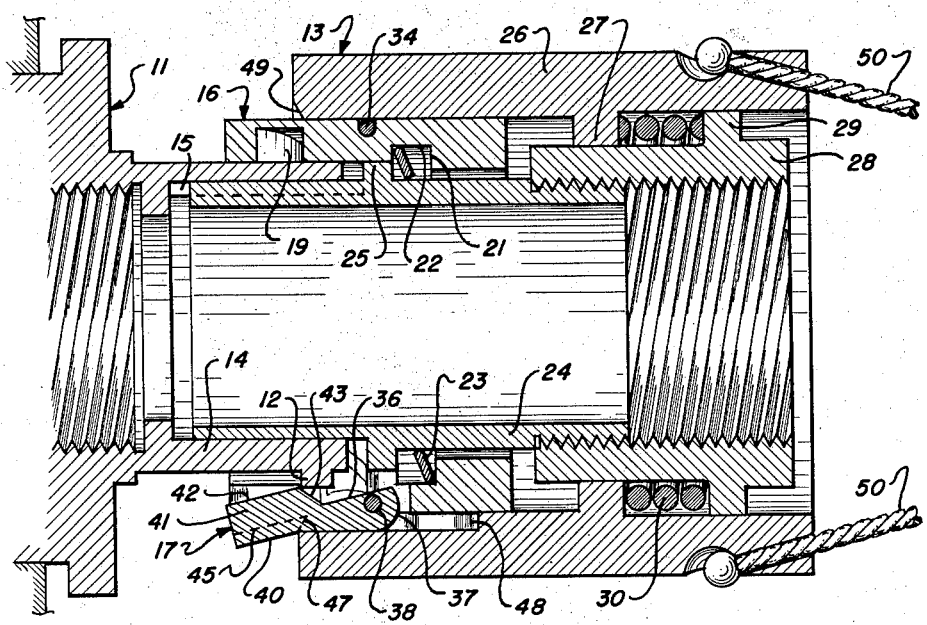
FIG. 2 is a longitudinal sectional view showing the position of the bayonet pin holding means and other parts upon actuation of the release mechanism.

When the first portion or half 11 and second portion or half 13 are assembled as above described and as shown in FIG. 1 and it is desired to rapidly disassemble the connector, an axial load is applied, for example by a pull on the lanyard 50. Under this load the sleeve 26 moves in an axial direction away from the first portion 11 and against the bias of the spring 30 so as to compress the latter. The ring 16 and latch means 17 remain in their positional relationship to the first portion 11 due to the pins 12 acting against the camming surfaces 43 of the latch means 17. This condition maintains until the inclined end surfaces 47 of the ear-like projections 45 on the latch means 17 reach a position common with the beveled end 49 of the sleeve 26. While in such position the latch means 17, under the urging of the pins 12 acting against the camming or levering surface 43, are caused to pivot outwardly about the locking wire 34 and assume a position such as shown in FIG. 2. Thus, when in this last mentioned position the pins 12 have sufficient clearance to pass by the latch means 17 and effect complete separation of the first and second portions. Once the pins 12 have cleared the latch means 17 the load is removed from the lanyard 50 allowing the compression spring 30 to return the latch means 17 and sleeve 26 to their normal positions, as shown in FIG. 3.

It will be seen that the present invention provides a highly desirable connector assembly in which the mating parts can readily, quickly and positively be joined and in which the mating parts can also be readily and rapidly disconnected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A device of the character described comprising the combination of first mating means including a pair of coaxially arranged and relatively movable annular portions, means for normally yieldably maintaining said portions in predetermined reationship with respect to each other, a member intermediate said pair of portions including a sloping projection-receiving-and-guiding groove extending from a position adjacent one end of the member to a location removed therefrom and including an axially extending projection-discharging slot having a depth at least equal to said groove providing open communication between the said one end and the groove adjacent said removed location thereof, latching means swingably mounted adjacent one end thereof on said member and having a section with an inwardly disposed camming surface thereon communicating with and normally extending into the axial slot and normally retained therein by one of said pair of portions, and second mating means including a projection extending therefrom for reception in said groove and retention in abutting and operative relationship with said camming surface, said one of said pair of portions being axially movable with respect to the other of said pair of portions and with respect to said member for compressing said yieldable means to release the retention of said latching means and cause the projection to exert a repeling force upon the said inwardly disposed camming surface of said section to swing the latter outwardly and facilitate unrestricted axial passage of said projection through the axial slot.

2. The device claimed in claim 1 wherein a plurality of sloping grooves are provided in said member with each groove being provided with an axially extending slot and operatively associated latching means, and wherein said second mating means is provided with a plurality of projections each adapted to be received in one of said sloping grooves.

3. The device claimed in claim 1 wherein the said one portion encircles the other of said pair of portions and is provided with an axially extending groove communicating with one end thereof for receiving another section of said latching means to thereby prevent relative rotation between said one portion and said member, and wherein means are provided operatively intermediate the other of said pair of portions and said member for controlling the relative axial movement between said member and said one portion in a direction opposite to the latching means releasing movement of the said one portion and for maintaining the projection in the abutting and operative relationship with the camming surface.

4. The device claimed in claim 3 wherein the section of the latching means which extends into the slot is of elongate shape communicating with substantially the full length of said slot and comprises about one half the length of the latching means, the section of the latching means which extends into the axial groove includes an arcuate outer surface, said inwardly disposed camming surface interconnects the inner surface of the first mentioned section and the inner surface of said another section, fastening means pass through said another section adjacent one end thereof to swingably mount and fasten said latching means on said member, and wherein extension means is provided on the outer surface of the first mentioned section for maintaining the latter in a predetermined position within said slot and said axial groove until said one portion is axially moved.

References Cited in the file of this patent

UNITED STATES PATENTS

| | | |
|---|---|---|
| 255,523 | Lightburne | Mar. 28, 1882 |
| 320,939 | Longmore | June 30, 1885 |
| 459,951 | Warner | Sept. 22, 1891 |
| 989,251 | Hall | Apr. 11, 1911 |
| 1,022,851 | Knack | Apr. 9, 1912 |
| 2,473,286 | Mall | June 14, 1949 |
| 2,888,278 | Torres et al. | May 26, 1959 |